United States Patent [19]

Grubbs et al.

[11] Patent Number: 5,216,083
[45] Date of Patent: Jun. 1, 1993

[54] POLYMERIZATION OF CIS-5,6-BIS(TRIMETHYLSILOXY)-1,3-CYCLOHEXADIENE AND OTHER SUBSTITUTED CYCLOHEXADIENES

[75] Inventors: Robert H. Grubbs, South Pasadena; Douglas L. Gin, Pasadena; Vincent P. Conticello, Pasadena; Philip D. Hampton, Pasadena, all of Calif.; David R. Wheeler, Los Alamos, N. Mex.

[73] Assignee: California Institute of Technology, Pasadena, Calif.

[21] Appl. No.: 831,793

[22] Filed: Feb. 5, 1992

Related U.S. Application Data

[62] Division of Ser. No. 647,576, Jan. 29, 1991, Pat. No. 5,128,418.

[51] Int. Cl.5 ............................................ C08F 130/08
[52] U.S. Cl. ................................. 525/326.5; 525/342; 526/171; 526/279; 526/308
[58] Field of Search ................ 526/171, 279, 308, 309

[56] References Cited

U.S. PATENT DOCUMENTS 4,536,555  8/1985  Ballara et al. ........................ 526/295

Primary Examiner—Joseph L. Schofer
Assistant Examiner—M. Nagumo
Attorney, Agent, or Firm—Benman & Collins

[57] ABSTRACT

The monomer cis-5,6-bis(trimethylsiloxy)-1,3-cyclohexadiene can be polymerized with certain catalysts, such as bis(allyltrifluoroacetato nickel (II)) and bis(allylpentafluorophenoxy nickel II). The resulting polymer is a precursor to poly(para-phenylene). Other substituted cyclohexadienes may also be polymerized by these catalysts to form useful polymers.

7 Claims, 15 Drawing Sheets

POLYMERIZATION OF CIS-5,6-BIS(TRIMETHYLSILOXY)-1,3-CYCLOHEXADIENE AND OTHER SUBSTITUTED CYCLOHEXADIENES

ORIGIN OF INVENTION

The U.S. Government has rights in this invention pursuant to Contract No. AFOSR-88-0094, awarded by the Department of the Air Force.

This is a division of application Ser. No. 07/647,576, filed Jan. 29, 1991, now U.S. Pat. No. 5,128,418.

TECHNICAL FIELD

The present invention relates to the polymerization of poly(para-phenylene), and, more particularly, to the preparation of a precursor thereto.

BACKGROUND ART

Poly(para-phenylene) (PPP) is a fully aromatic, rigid rod polymer with unique structural and conductive properties. As an engineering plastic, its attractiveness arises from its thermal stability (mp>500° C.), high strength, chemical inertness, and solvent resistance. When doped with either n- or p-type dopants, the polymer forms highly conducting charge transfer complexes with conductivities up to 500 S/cm. However, the structural properties which make PPP so attractive also make it a difficult polymer to synthesize. In addition, many of the observed properties of the polymer depend on the method of production.

Previous methods of producing PPP directly have met with only limited success. For example, oxidative cationic polymerization of benzene to produce PPP has been attempted. However, only short oligomers of ten to fifteen repeat units containing mixtures of linear 1,4- and non-linear 1,2-units were formed.

Polymerizations using nickel catalyzed aryl coupling of 1,4-dihalobenzenes were attempted. While this method produced a completely linear molecule, only short oligomers consisting of ten to twelve units were formed.

The problem with these direct synthetic methods is that the inherent insolubility of the polymer causes it to precipitate out of solution before high molecular weight materials can be formed. Electrochemical coupling of benzene has also been used, but the resulting film is insoluble and composed of a mixture of 1,4- and 1,2-units.

In order to circumvent the problem of the inherent insolubility of PPP in production and processing, soluble precursor methodologies have been developed. For example, polymers of 1,3-cyclohexadiene (CHD) have been used as a soluble precursor polymer. In particular, poly(cyclohexadiene) has been reacted with bromine and then pyrolyzed to eliminate HBr. Unfortunately, this polymerization route also produces a precursor polymer with a mixture of 1,4- and 1,2-linkages. In addition, the elimination reaction is not very efficient, since HBr readily reacts with unsaturated intermediates.

Recently, the efficient production of PPP has been reported, via the pyrolysis of a soluble precursor polymer prepared from the radical polymerization of the acetyl and methoxycarbonyl derivatives of 5,6-dihydroxy-1,3-cyclohexadiene (DHCD); see, e.g., D.G. Ballard et al, *Macromolecules*, Vol. 21, pp. 294–304 (1988) and D.R. McKean, *Macromolecules*, Vol. 20, pp. 1787–1792 (1987). The starting cis-diol is produced by the microbial oxidation of benzene. The precursor films are soluble and can be processed before pyrolyzing into the final polymer. However, the radical polymerization produces about 85% 1,4-units and 15% 1,2-units. The 1,2-units create "kinks" in the polymer, thereby reducing the elimination efficiency of the precursor and the mechanical properties of the final polymer.

In order for the good mechanical properties of PPP to be realized, an aspect ratio of at least 100 consecutive linear units per 1,2-unit must be obtained. All previous routes to PPP have either produced low molecular weight materials due to insolubility of the growing polymer, or have incorporated a significant amount of 1,2-linkages in the chains, or both. Hence, it is desirable to find an exclusively 1,4-polymerization method which can be used in combination with the efficient precursor method described above.

DISCLOSURE OF INVENTION

In accordance with the invention, cis-5,6-bis(trimethylsiloxy)-1,3-cyclohexadiene is polymerized in the presence of a catalyst selected from the group consisting of bis(allyltrifluoroacetato nickel II) and bis(allylpentafluorophenoxy nickel II). This novel polymer is suitably employed as a precursor to PPP.

The foregoing two catalysts may also be employed in polymerizing other substituted cyclohexadienes, with substituents in the 5 or the 5,6 position(s). The resulting polymers are also novel.

BEST MODES FOR CARRYING OUT THE INVENTION

Figure 1A:
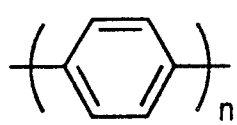
FIGS. 1a and 1b depict the 1,4- and 1,2-linkages of poly(para-phenylene), respectively.
Figure 1B:
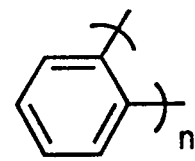

The 1,4- and 1,2-linkages of poly(para-phenylene) (PPP) are depicted in FIGS. 1a and 1b, respectively. It is desired to produce PPP having substantially 100% 1,4-linkages, which is defined herein as at least about 96%. The process of the invention results in PPP having such linkages. The substantially 100% 1,4-linkages achieved in accordance with the invention is considerably higher than that achieved in the prior art; PPP prepared by prior art processes typically includes 10 to 15% 1,2-linkages.

Figure 2:
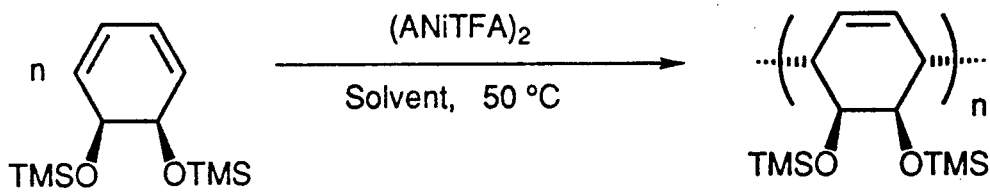
FIG. 2 depicts the polymerization of cis-5,6-bis(trimethylsiloxy)-1,3-cyclohexadiene (TMS-CHD)
Figure 3A:
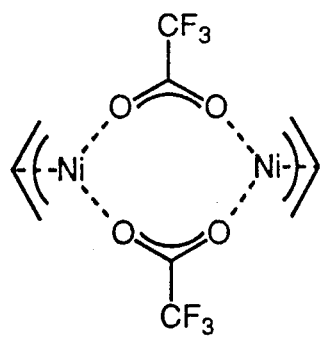
FIG. 3a depicts the structure of bis(allyltrifluoroacetato nickel II) (ANiTFA)$_2$.
Figure 3B:
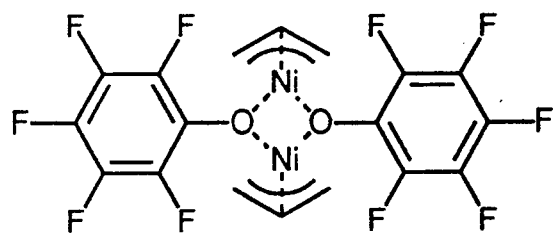
FIG. 3b depicts the structure of bis(allylpentafluorophenoxy nickel II)

The reaction sequence for polymerizing cis-5,6-bis-(trimethylsiloxy)-1,3-cyclohexadiene (TMS-CHD) is shown in FIG. 2. The polymerization is achieved, preferably using one of the following catalysts: bis(allyltrifluoroacetato nickel II) ((ANiTFA)$_2$) and bis(allylpentafluorophenoxy nickel II). The structures for these two catalysts are given in FIGS. 3a and 3b, respectively.

Bis(allyltrifluoroacetato nickel(II)) (ANiTFA)$_2$ is known to polymerize 1,3-butadiene to exclusively 1,4-polybutadiene (PBD). The cis/trans ratio of the poly(butadiene) produced, as well as other properties such as molecular weight, depend on the solvent system used during polymerization and the presence of electron donating or accepting additives.

Although (ANiTFA)$_2$ has been thoroughly studied with butadiene, it has not been used with cyclic 1,3-dienes or in the presence of heteroatom functionalities. This catalyst has never, at least to Applicants' knowledge, homopolymerized a heteroatom-substituted diene, or a cyclic diene It has only been used to copolymerize a heteroatom-substituted diene with butadiene Also, transition metal catalysts used for diene polymerization are generally not compatible with heteroatom functionalities, and there has not been a demand for poly-cyclic dienes or functionalized PBD. Only the elastomers and thermoplastics of PBD have been in demand. The usefulness of functionalized dienes (especially for PPP) has only been recently discovered.

For polymerizing cyclic monomers, the cis/trans geometry is of no concern, since the ring will always adopt a cisoid diene configuration. Only the 1,4- vs. 1,2-regiochemistry is important, and whether the catalyst is compatible with polar functionalities.

To determine the possible use of (ANiTFA)$_2$ in polymerizing the trimethylsiloxy-substituted cyclohexadiene, the polymerization of 1,3-cyclohexadiene (CHD) using this catalyst was studied. A small amount of white, insoluble poly(cyclohexadiene) (PCHD) powder was produced, which indicated that (ANiTFA)$_2$ can polymerize a cyclic diene system. However, owing to the polymer's insolubility, the 1,4- vs. 1,2- content could not be determined.

Working under the assumptions that the efficiency of the reaction was limited by either the insolubility of the growing chains or the catalyst activity's solvent dependence, the effect of various solvents on the system was studied. The results are listed in Table I, below.

TABLE I

| Solvent Trends on CHD Polymerization. | | |
|---|---|---|
| Solvent | % Yields | Polymer Properties |
| (neat) | 27.1 | insoluble |
| n-heptane | 4.7 | insoluble |
| benzene | 11.2 | sol., >90% 1,4 |
| chlorobenzene | 31.3 | insoluble |
| o-dichlorobenzene | 66.7 | insol., crystalline |
| o-dichlorobenzene/BHT | 55.5 | insol., crystalline |

Further purification of the monomer prior to reaction made isolated yields up to 88.4% possible Clearly, the more polar solvents produce higher polymer yields This appears to be a solvent effect on the catalyst, since in all cases, the polymer produced was insoluble in these solvents. Only in the case of benzene was a small fraction of the resulting polymer soluble enough for NMR analysis By comparing the ratio of the integrals of the $^1$H NMR signals at 1.6 and 2.0 ppm, the soluble fraction of the PCHD sample was determined to be approximately 95% 1,4-linked. Gel permeation chromatography (GPC) of the soluble fraction revealed that the chains are only comprised of ten to eleven monomer units with a polydispersity index (PDI) of 1.78.

The 1,4-regiochemistry of the polymers produced was also supported by the fact that the insoluble polymers were crystalline. Wide angle, powder X-ray diffraction on the polymers showed sharp diffraction lines corresponding to lattice spacings similar to those observed for crystalline terphenyl and PPP.

Differential scanning calorimetry (DSC) revealed that the crystalline PCHD was thermally stable up to 320° C. This value is over 100° C. higher than the PCHD samples produced by one prior art technique, involving Ziegler catalysts (TiCl$_4$) and cationic polymerization of benzene (D.A. Frey et al, *Journal of Polymer Science*, Part A, Vol. 1, p. 2057-2065 (1963)), and slightly higher than those made with a similar allyl nickel iodide catalyst whose composition was reported to be >90% 1,4-linked. Endotherms at 367° C. and approximately 510° C. were also observed for this polymer. It is not clear what these endotherms are due to; decomposition and glass transitions are possibilities.

(ANiTFA)$_2$ can also be used in o-dichlorobenzene to polymerize 5-alkyl-1,3-cyclohexadienes, as can the catalyst bis(allylpentafluorophenoxy nickel II). These alkyl-substituted PCHD polymers have interesting properties and may be useful in the future as comonomers. These polymers appear to be soluble materials which can be used in high temperature environments (due to their high thermal stability), as exemplified by 5-methyl-1,3-cyclohexadiene. Other alkyl groups include neo-pentyl. The process for forming these alkyl cyclohexadienes works with any 1,3-cyclohexadiene with pure hydrocarbon chains on the 5 and/or 6 positions on the ring.

Reaction of the acetyl derivative of cis-5,6-dihydroxy-1,3-cyclohexadiene (DHCD) with (ANiTFA)$_2$ did not produce any polymers, nor did the reaction of the methoxycarbonyl derivative. Analysis of the resulting reaction mixture in each case revealed that most of the monomer remained intact, but the catalyst decomposed to a green solid reminiscent of an inorganic nickel salt.

However, a 1:1 ratio of 1,3-cyclohexadiene (CHD) and bis(methoxycarbonyl)-1,3-cyclohexadiene (BMC-CHD) in benzene did produce a copolymer in low yields. The product was a soluble white powder whose $^1$H NMR spectrum clearly showed a signal at 3.75 ppm due to incorporated methoxycarbonyl functionalities. The effect of various solvents on this polymerization system was studied as in the case of PCHD; the results are tabulated in Table II, below.

TABLE II

| Solvent Trends on a 1:1 Feed Ratio of CHD and BMC-CHD. | |
| --- | --- |
| Solvent | % Yield |
| (neat) | 1.5 |
| benzene | 1.5 |
| toluene | 0.4 |
| chlorobenzene | 2.3 |
| o-dichlorobenzene | 4.5 |

In all cases, a 1:1 ratio of the two monomers produced polymers which were completely soluble. GPC analysis indicated that the products should be considered short oligomers rather than polymers.

Once the best solvent for the system was determined to be ortho-dichlorobenzene (o-DCB), a study to determine how different monomer feed ratios would affect the polymer yields and properties was undertaken. The results are summarized in Table III.

TABLE III

| Feed Ratio Trends on Copolymerization in o-DCB. | | |
| --- | --- | --- |
| CHD | BMC-CHD | % Yield |
| 0 | 100 | 0 |
| 1 | 10 | 1.6 |
| 1 | 4 | 2.4 |
| 1 | 2 | 2.6 |
| 1 | 1 | 4.5 |
| 2 | 1 | 3.5 |
| 4 | 1 | 5.8 |
| 10 | 1 | 13.2 |
| 100 | 0 | 66.7 |

While greater BMC-CHD to CHD ratios greatly reduce the polymer yields due to catalyst deactivation, they also increase the solubility of the polymer due to greater methoxycarbonyl monomer incorporation in the polymer.

The conclusion that can be drawn from the foregoing is that use of the acetyl and methoxycarbonyl derivatives of DHCD with (ANiTFA)$_2$ does not provide a better route to a PPP precursor. Functional group incompatibility with the catalyst is the most likely reason. This assumption was confirmed by adding various amounts of a carbonyl-containing compound (ethyl acetate; EtOAc) to a typical CHD polymerization reaction. The results are shown in Table IV, below.

TABLE IV

| Effect of Ethyl Acetate on CHD Polymerization. | | | |
| --- | --- | --- | --- |
| Catalyst | EtOAc | CHD | % Yield |
| 1 | 0 | 470 | 66.7 |
| 1 | 4 | 470 | 19.7 |
| 1 | 470 | 470 | 2.5 |

The most plausible explanations for these functional group incompatibilities are (1) that the polar carbonyl group can coordinate to the catalyst open site, thereby causing deactivation, or (2) that ester exchange reactions occur to give an inert nickel species when other ester-like groups are present. Another possibility for the monomers' incompatibility may be that the catalyst facilitates aromatization, as in the case of CHD, and the acidic side products of this reaction (ROH) destroy the catalyst.

Figure 6:
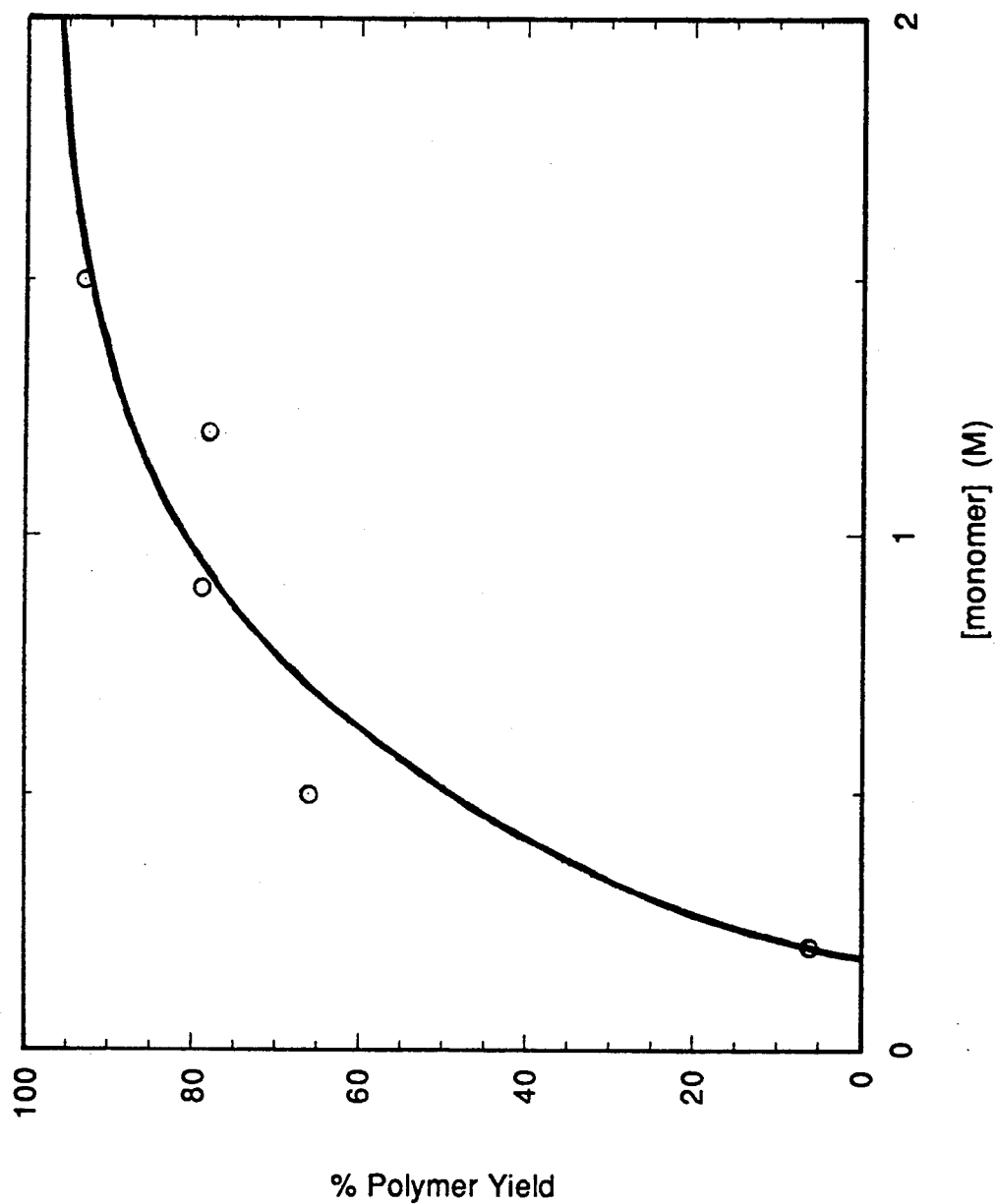
FIG. 6, on coordinates of percent polymer yield and monomer concentration (molar), is a plot of the dependence of polymer yield as a function of monomer concentration for the TMS-CHD system, with the monomer-to-catalyst ratio =80:1, where the catalyst is bis(allyltrifluoroacetato nickel II)
Figure 7:
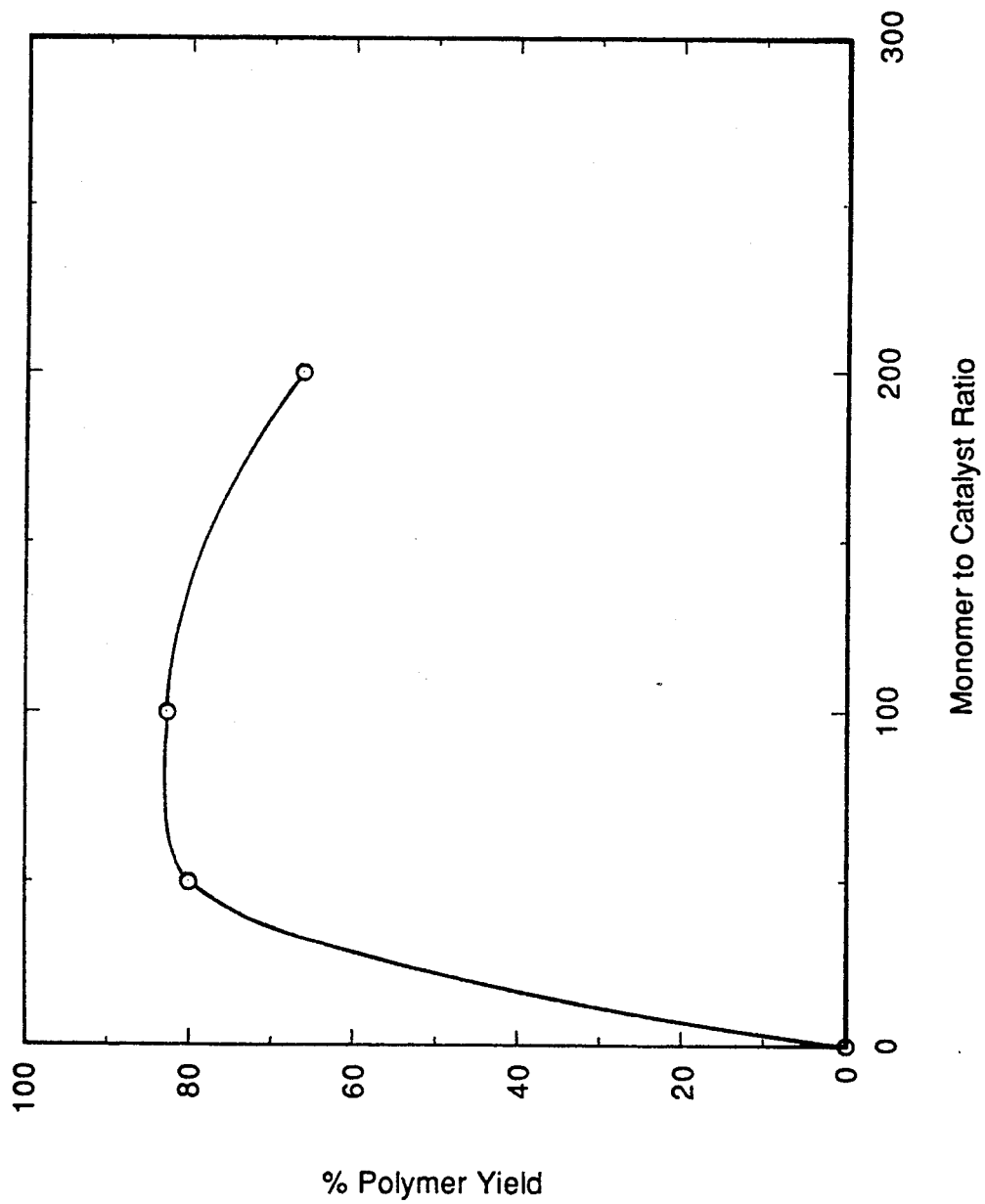
FIG. 7, on coordinates of percent polymer yield and ratio of monomer to catalyst, is a plot of the dependence of polymer yield as a function of the monomer-to-catalyst ratio for the system of FIG. 6.

Cis-5,6-bis(trimethylsiloxy)-1,3-cyclohexadiene (TMSCHD) was prepared from cis-DHCD and reacted with (ANiTFA)$_2$ The polymerization of TMS-CHD with (ANiTFA)$_2$ in chlorobenzene has been optimized, and the percent yields show dependencies on the concentration of TMS-CHD and monomer-to-catalyst ratio, FIGS. 6 and 7, respectively. There, it is seen that the polymer yield is at least about 80% for a monomer concentration of at least about 0.9 Molar (monomer-to-catalyst ratio=80:1) and that the polymer yield is at least about 80% for a monomer-to-catalyst ratio in the range of about 50:1 to 150:1. Higher ratios may be used, providing the increased viscosity that accompanies such higher ratios is taken into account, such as by monomer dilution.

The lower limit of the TMS-CHD concentration is about 0.14 Molar; below this value, no polymer is formed. The optimum TMS-CHD concentration is about 1.5 Molar, which gives 93% isolated yield of polymer with a monomer:catalyst ratio of 80:1 (FIG. 6).

TMS-CHD has an oxygen-containing group which is relatively non-coordinating compared to carbonyl groups. Also, the monomer is less susceptible to aromatization, since TMS-OH is a relatively poor leaving group upon elimination in comparison to the acetate or carbonate groups.

Polymerization of this monomer with (ANiTFA)$_2$ was possible in a variety of aromatic solvents to give a soluble white powder which was suitable for GPC analysis. The results are listed in Table V, below.

TABLE V

| Polymerization of TMS-CHD in Various Aromatic Solvents. | | | | |
| --- | --- | --- | --- | --- |
| Solvent | Polymer Yield | Mn | Mw | PDI |
| benzene | 13% | 5667 | 6910 | 1.22 |
| chlorobenzene | 56 | 21466 | 37882 | 1.76 |
| o-dichlorobenzene | 24 | 24245 | 41495 | 1.71 |

The effect of solvent polarity on this system was different than with previous monomers. Although the catalyst is generally more active in more polar aromatic solvents, the polymer itself is more soluble in non-polar solvents. With chlorobenzene, which is between o-dichlorobenzene and benzene in terms of polymer chain solubility and catalytic enhancement, optimum yields were obtained. The polymerization was also performed in a 1:1 v/v solution of o-DCB and benzene. The isolated polymer yields were similar to those obtained with chlorobenzene. As can be seen in Table V, the molecular weights (Mw) are similar and correspond to average degrees of polymerization of 85 to 90. Isolated yields up to 93% are possible if the monomer concentration is increased, and the monomer is further purified by filtration through alumina.

Figure 4:
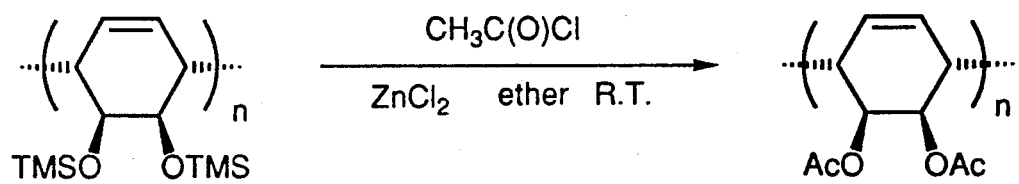
FIG. 4 depicts the conversion of 1,4-poly(cis-5,6-bis(trimethylsiloxy)-1,3-cyclohexadiene) to 1,4-poly(cis-5,6-diacetoxy-1,3-cyclohexadiene)
Figure 5:
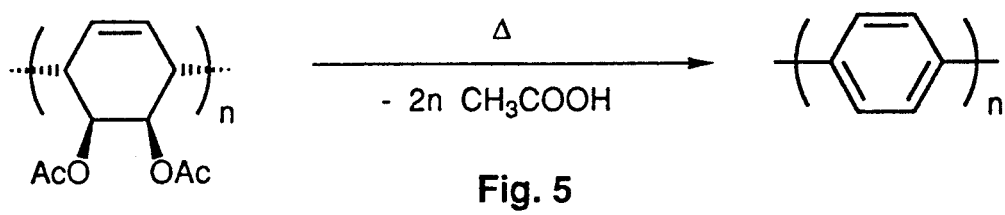
FIG. 5 depicts the thermal conversion of 1,4-poly(cis-5,6-diacetoxy-1,3-cyclohexadiene) to poly(para-phenylene)

The properties exhibited by poly(TMS-CHD) make it a promising precursor polymer to PPP. FIG. 4 depicts the conversion of poly(TMS-CHD) to the corresponding acetoxy derivative, while FIG. 5 depicts the conversion of the acetoxy derivative to PPP. This latter conversion is known in the art, as evidenced by the Ballard reference cited above.

Poly(TMS-CHD) is a novel polymer and is soluble in a variety of relatively non-polar organic solvents such as benzene, toluene, chlorobenzene, hexanes, THF, ether, chloroform, and methylene chloride. In highly polar solvents such as o-DCB, acetonitrile, alcohols, and water, the polymer is completely insoluble. Although the polymer precipitates out of solution as a fine white powder, it can also form colorless, clear, brittle, glassy films.

Figure 8A:
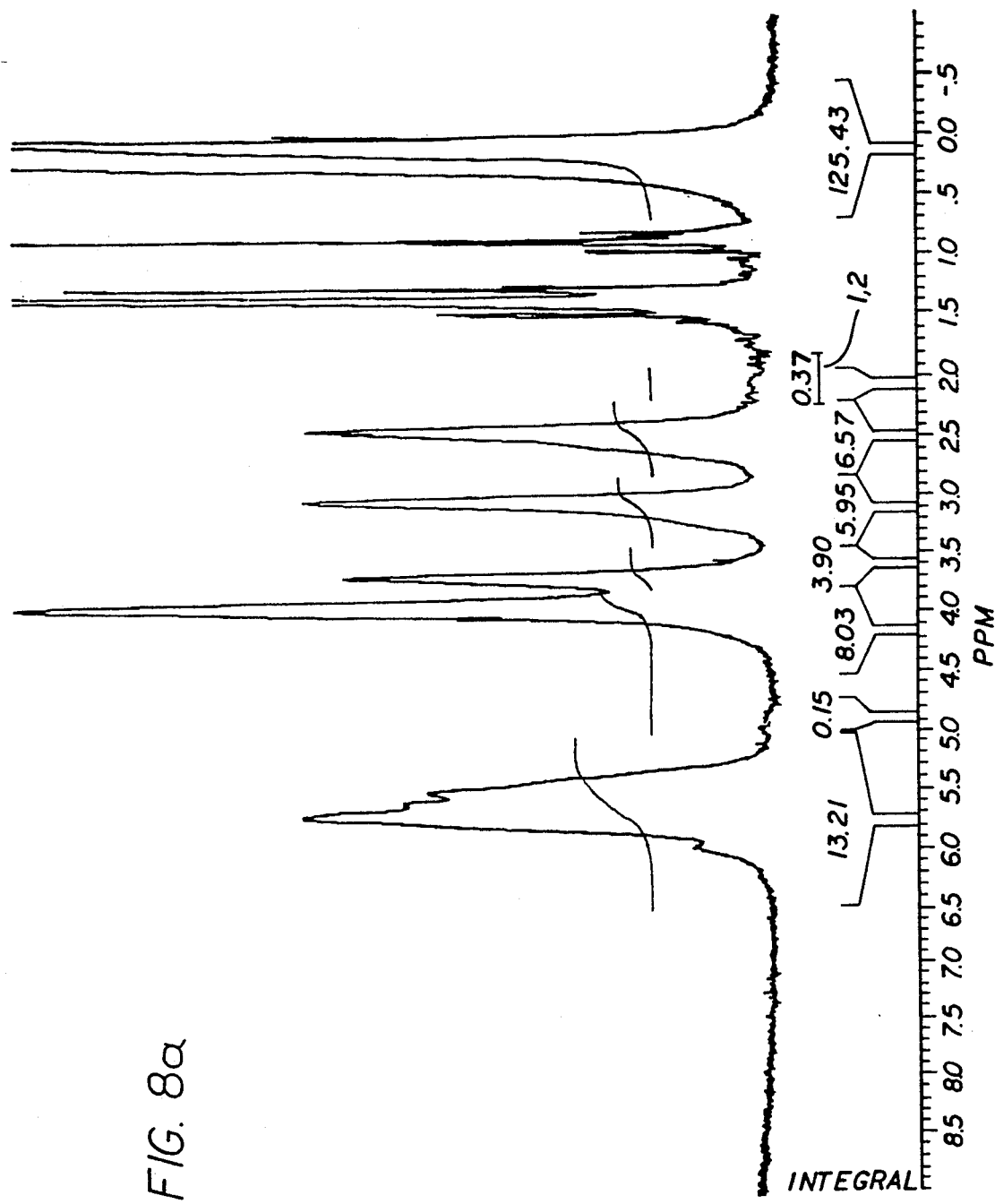
FIG. 8a, on coordinates of signal strength and chemical shift relative to tetramethyl silane, is the 500 MHz $^1$H NMR spectrum of poly(TMS-CHD) prepared with the catalyst (ANiTFA)$_2$.
Figure 8B:
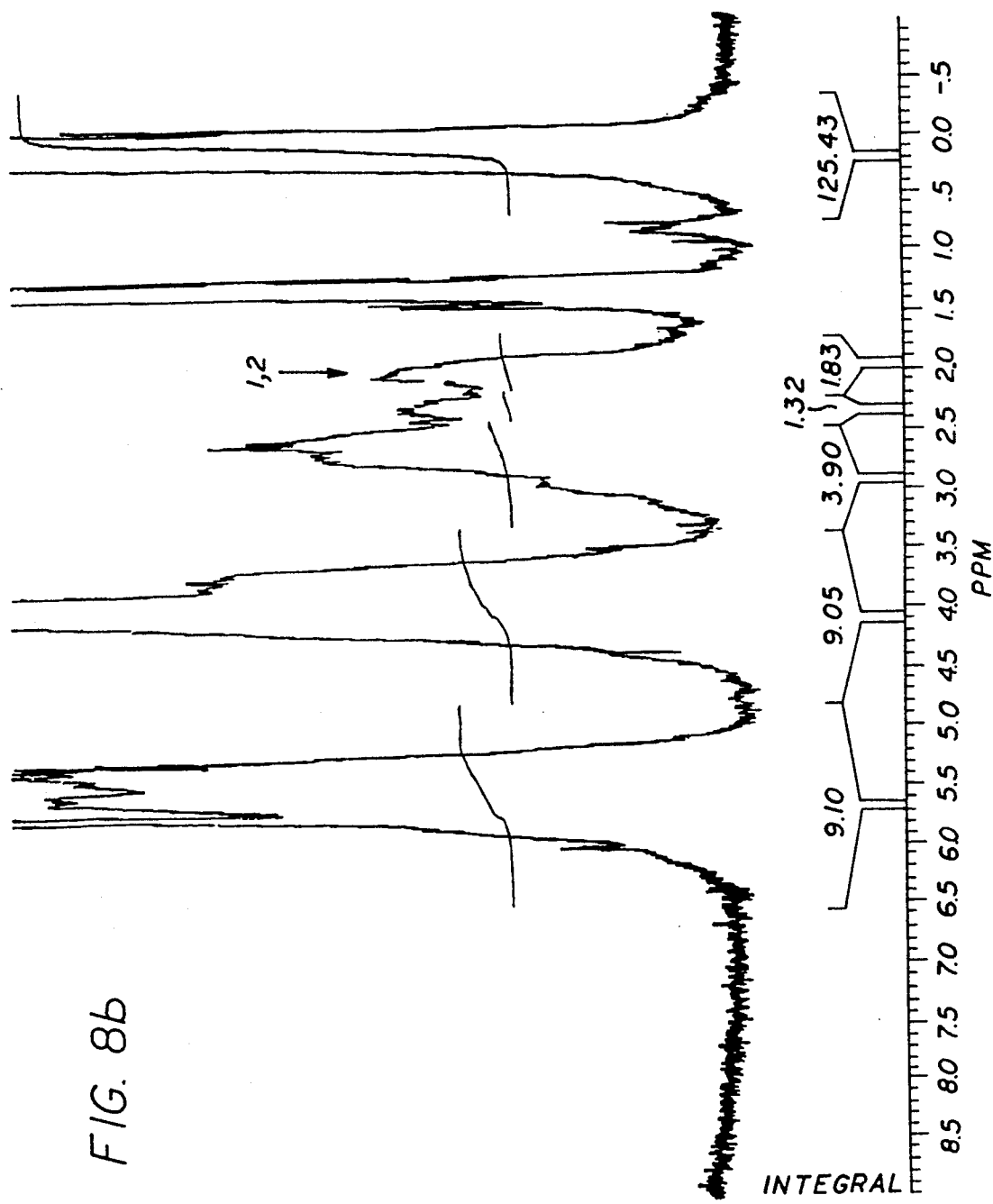
FIG. 8b, on the same coordinates as FIG. 8b, is the 500 MHz $^1$H NMR spectrum of radically polymerized poly(TMS-CHD) for comparison.

The regiochemistry of the poly(TMS-CHD) appears to be almost entirely 1,4-linked, as determined by $^1$H NMR analysis. In particular, it is expected that the presence of 1,2-units in similar polymers would be manifested as a proton signal in the 1.8 to 2.1 ppm range. There is, in fact, an absence of polymer proton signals in this region of the spectrum for poly(TMS-CHD). In contrast, radical polymerization of TMS-CHD only produced short oligomers with a distinct $^1$H NMR signal at 1.9 ppm due to 1,2-linkages (cf. FIGS. 8a and 8b).

Powder X-ray diffraction data provided further evidence that the poly(TMS-CHD) polymer is entirely 1,4-linked and linear.

Conversion of 1,4-poly(cis-5,6-bis(trimethylsiloxy-1,3-cyclohexadiene) to 1,4-poly(cis-5,6-diacetoxy-1,3-cyclohexadiene) (1,4-poly(DA-CHD) can be accomplished by adding acetyl chloride to a stirred solution of poly(TMS-CHD) and anhydrous zinc chloride or iron (III) chloride in diethyl ether, as illustrated in FIG. 4. 1,4-Poly(DA-CHD) has been shown in the prior art to be a precursor to poly(para-phenylene); see, e.g., the Ballard reference described above.

Figure 9A:
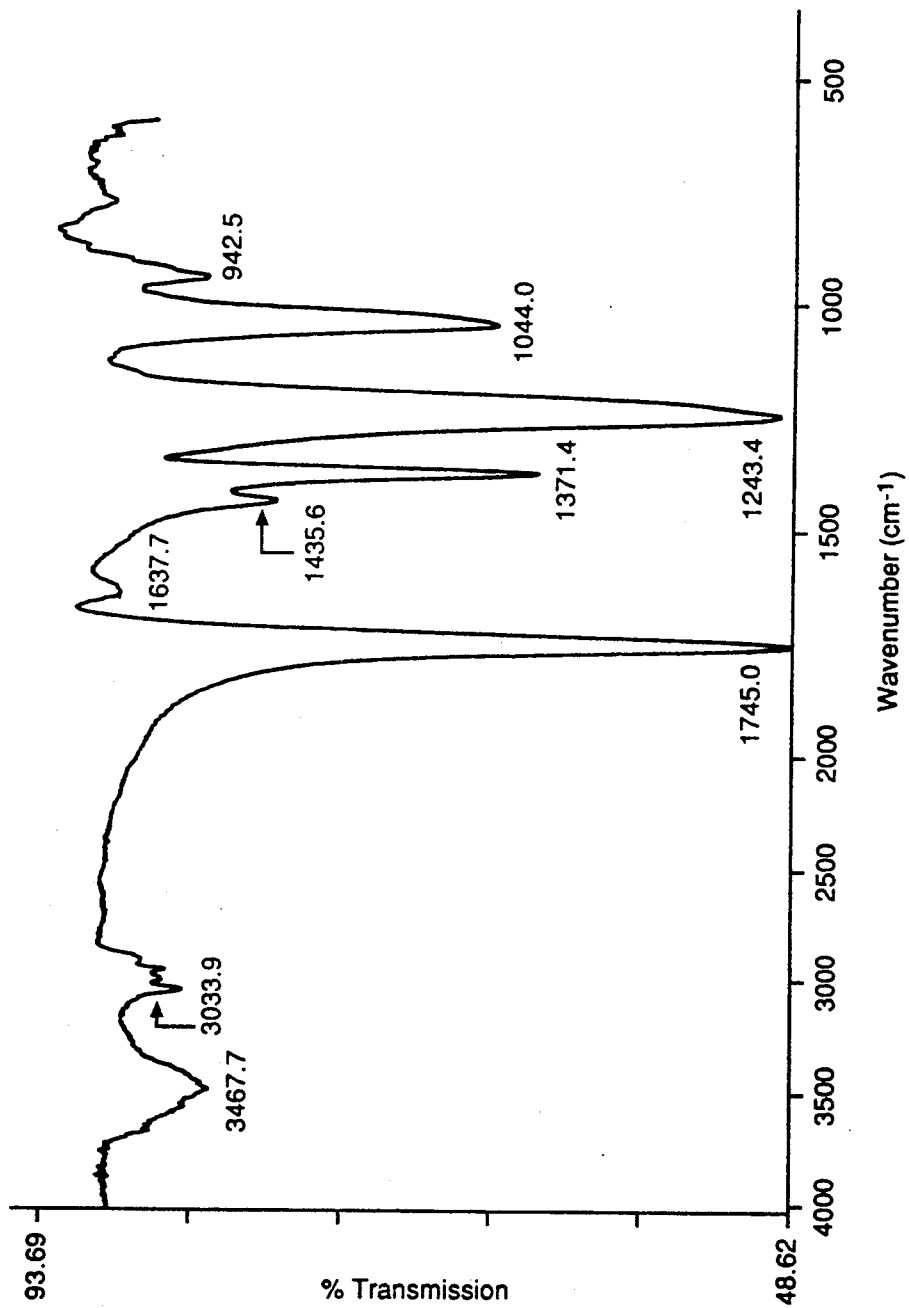
FIG. 9a is the IR spectrum of 1,4-poly(cis-5,6-diacetoxy-1,3-cyclohexadiene (poly(DA-CHD)) prepared by prior art radical polymerization.
Figure 9B:
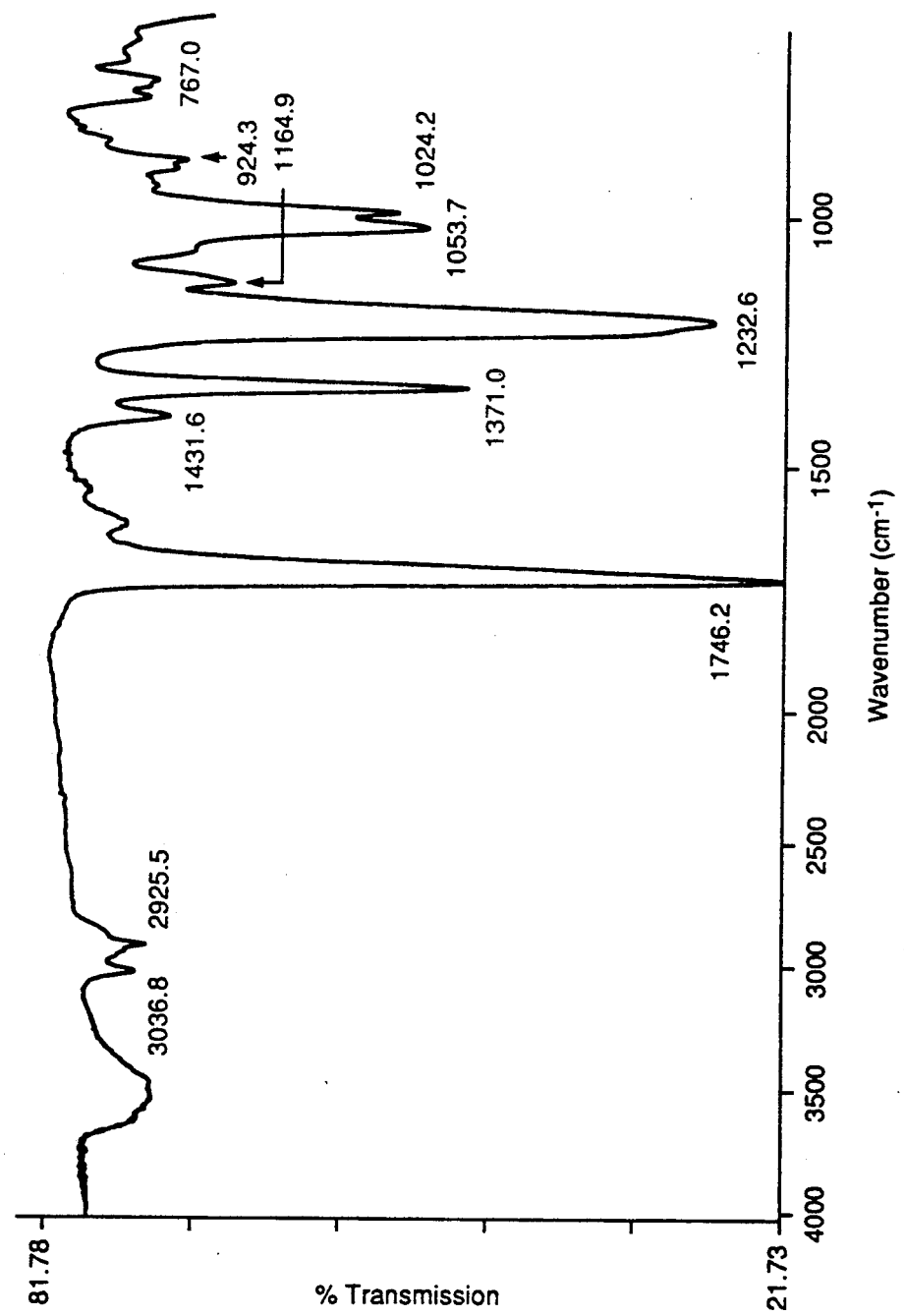
FIG. 9b is the IR spectrum of poly(DA-CHD) prepared from 1,4-poly(TMS-CHD) by the process of the invention.
Figure 10A:
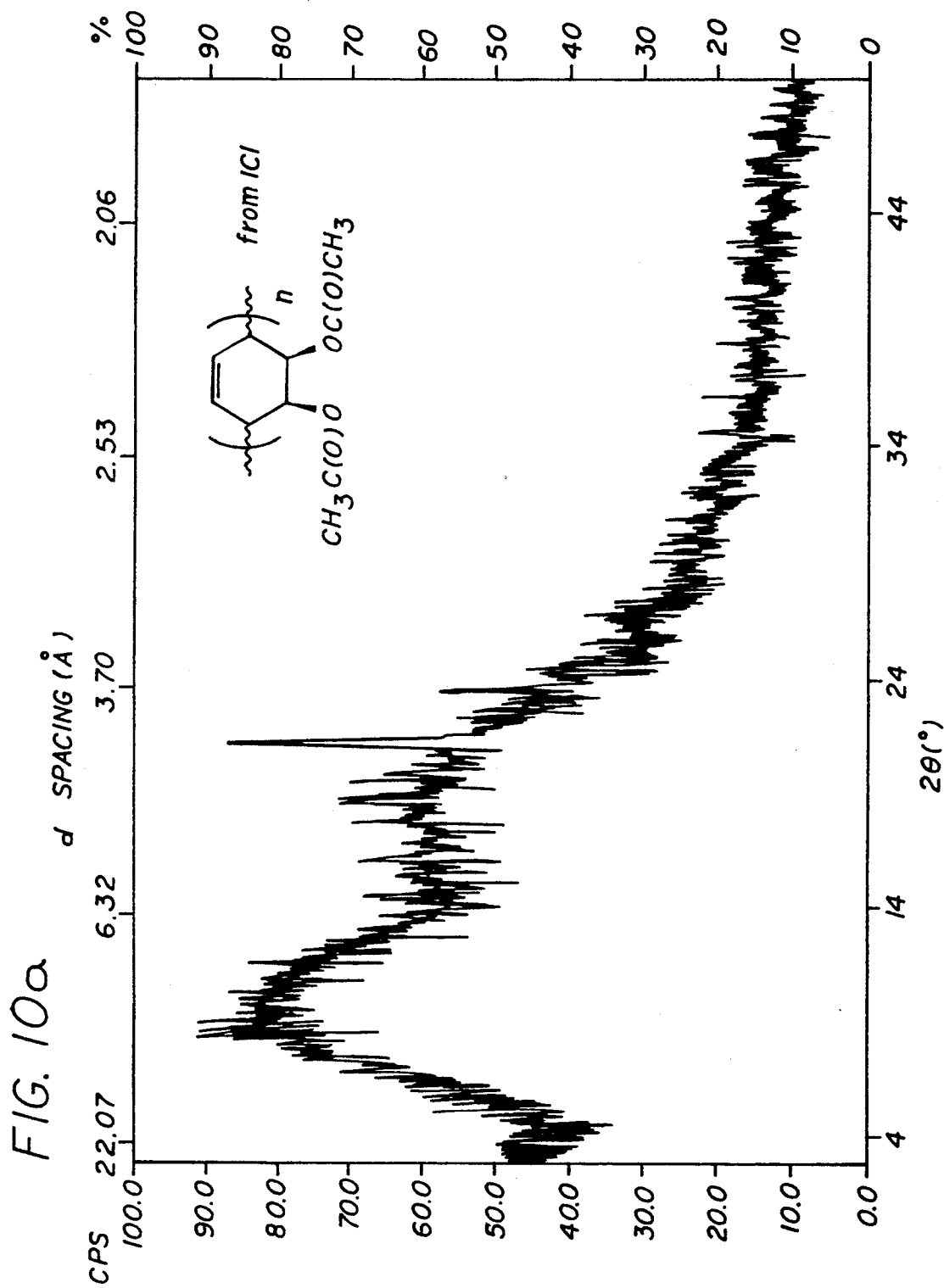
FIGS. 10a and 10b are the comparative powder X-ray data for poly(DA-CHD) made by radical polymerization and from poly(TMS-CHD), respectively.
Figure 10B:
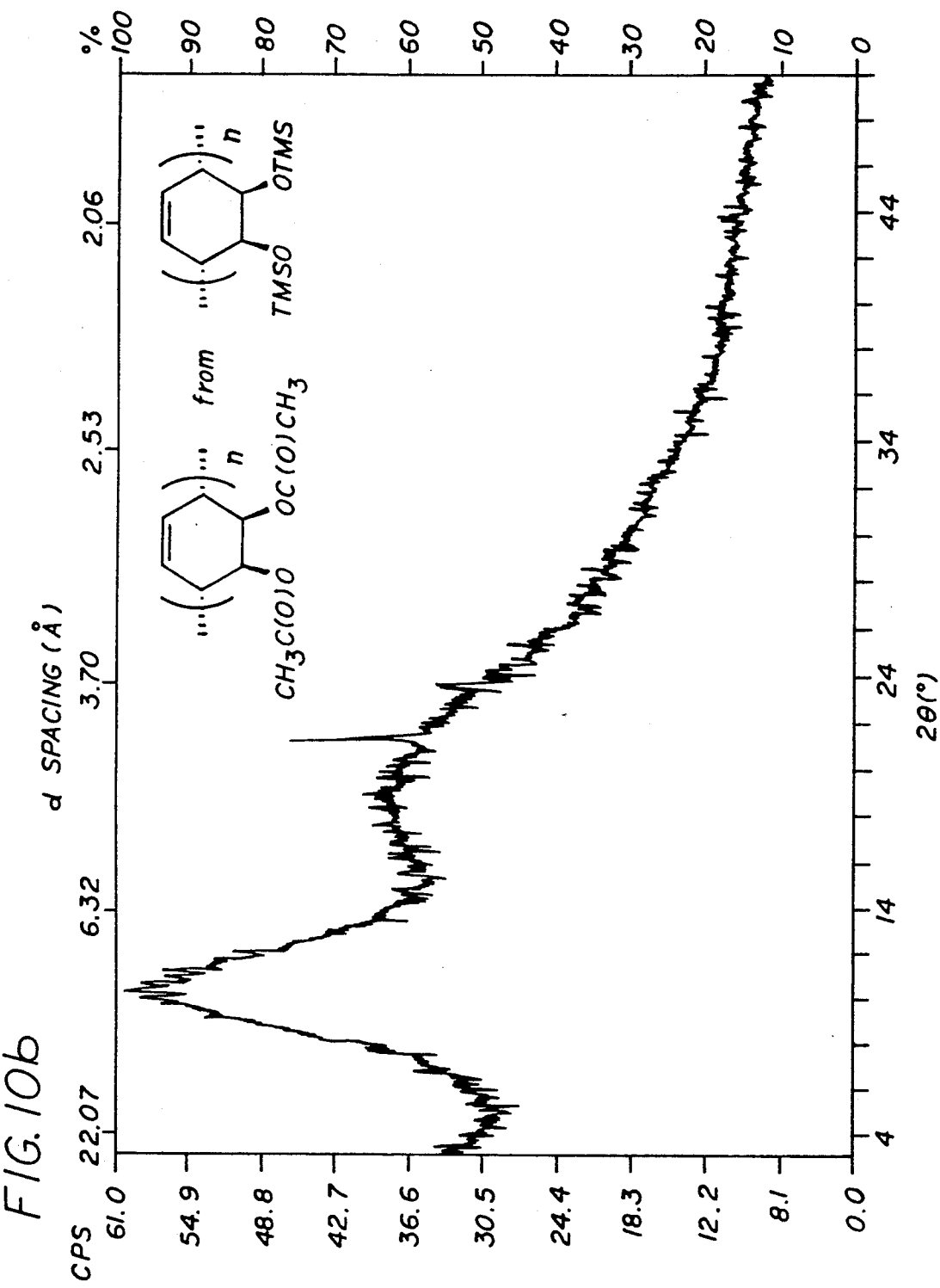

The 1,4-poly(DA-CHD) produced from 1,4-poly(TMS-CHD) is a soluble, white powder much like that produced using a radical initiator as described in the prior art. IR spectroscopy FIGS. 9a and 9b) and powder X-ray diffraction (FIGS. 10a and 10b) show that poly(DA-CHD) made by radical polymerization and from poly(TMS-CHD) are similar. Both materials are amorphous polymers.

Figure 11A:
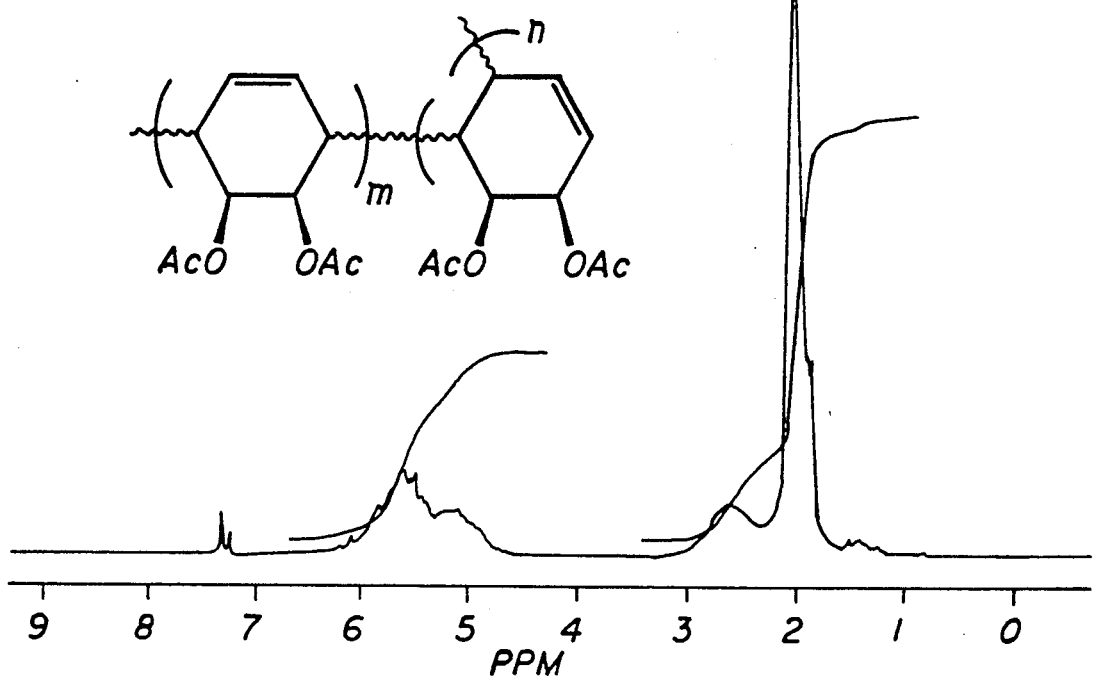
FIGS. 11a and 11b are the comparative 400 MHz $^1$H NMR spectra of poly(DA-CHD) made by radical polymerization and from poly(TMS-CHD), respectively.
Figure 11B:
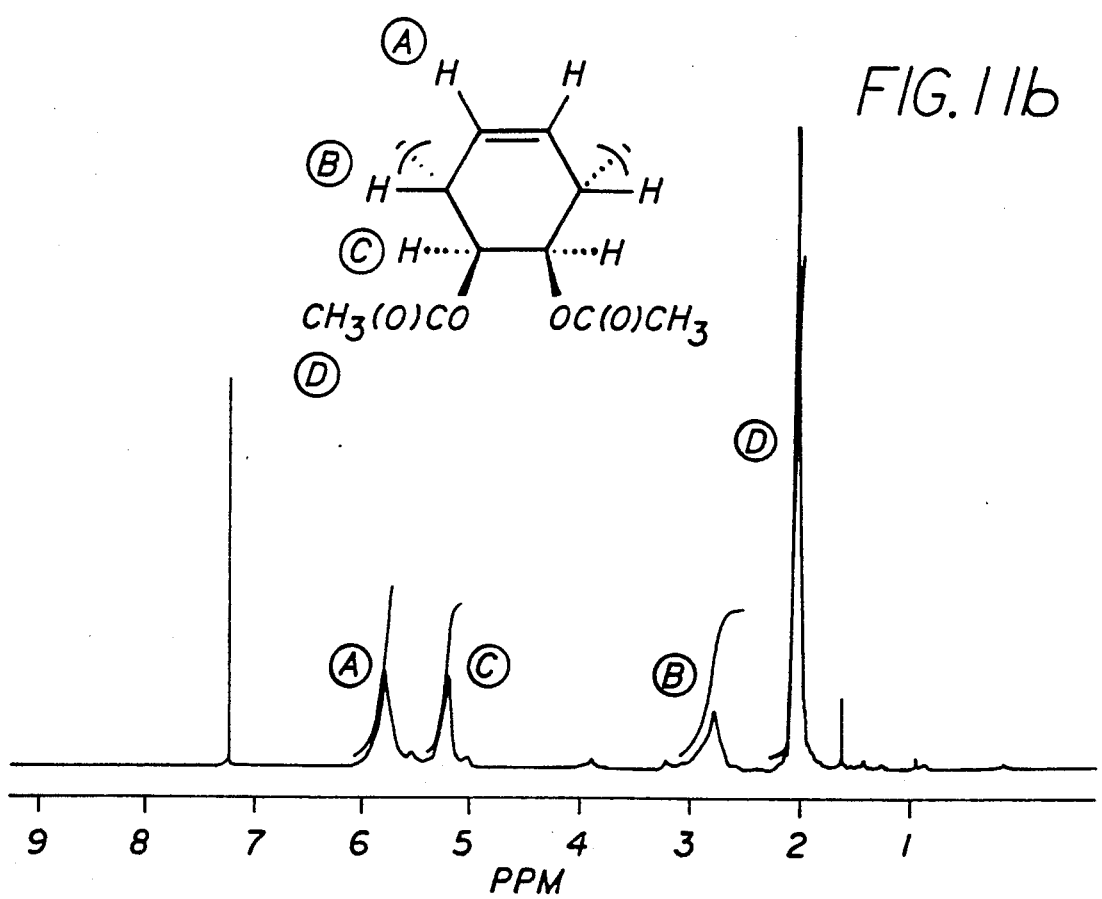

However, comparative $^1$H NMR spectroscopy and differential scanning calorimetry (DSC) of the 1,4-poly(DA-CHD) made from poly(TMS-CHD) and the 1,4-poly(DA-CHD) made by radical polymerization have marked differences, owing to the regular stereo- and regiochemistry of the polymer produced from the (ANiTFA)$_2$ catalyzed poly-(TMS-CHD). In contrast, the radically polymerized poly(DA-CHD) has a random stereochemistry across the cyclohexenyl repeat units in addition to having 10 to 15% 1,2-units. These differences are manifested in the 1,4-poly(DA-CHD) having sharper $^1$H signals in the NMR spectrum, even though gas phase chromatography (GPC) analysis shows that the 1,4-poly(DA-CHD) made by the process of the invention is about 27 times higher in molecular weight than that made by radical polymerization; the comparative NMR spectra are shown in FIGS. 11a and 11b.

Figure 12:
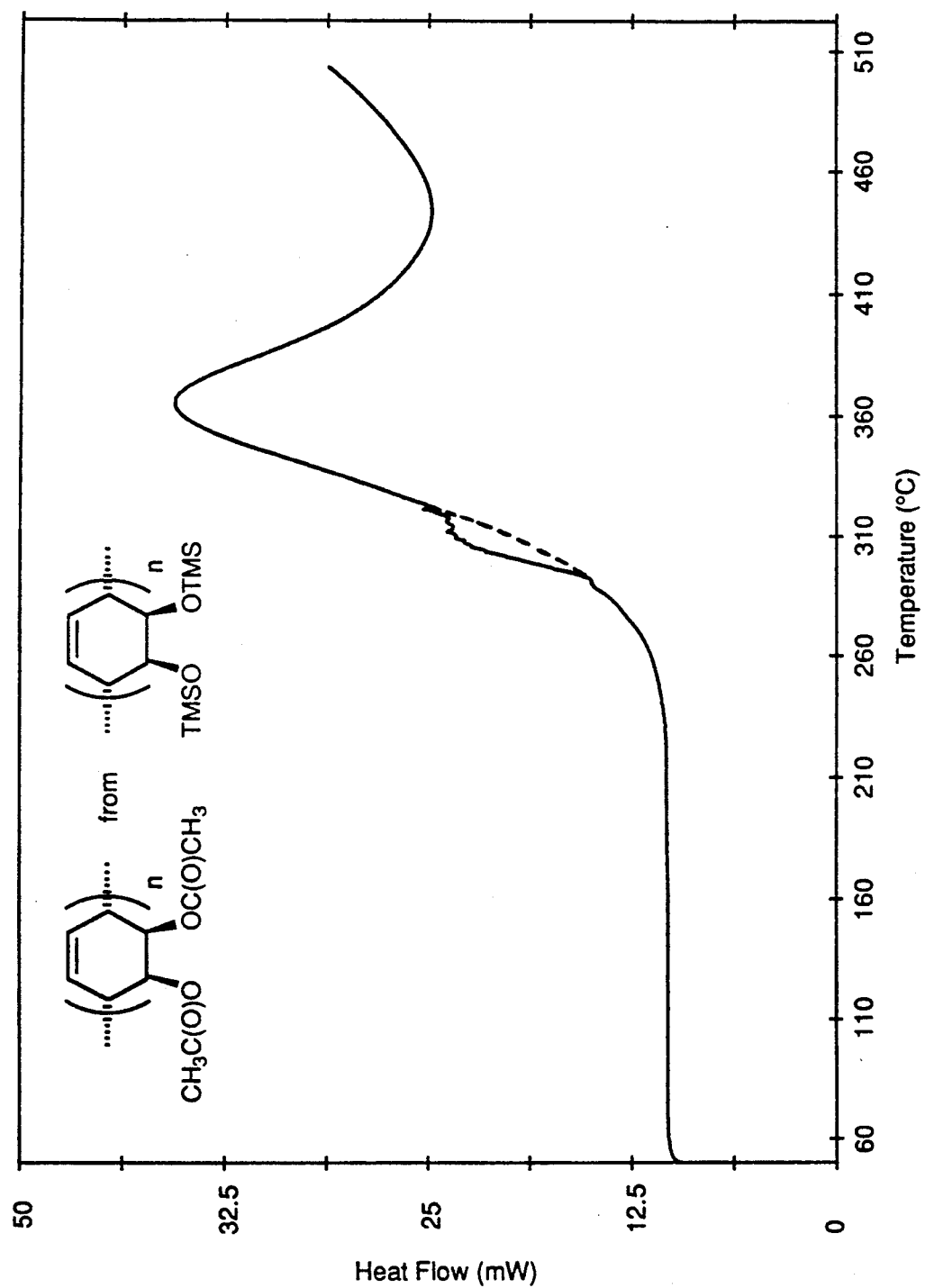
FIG. 12 is the differential scanning calorimetry profile of 1,4-poly(DA-CHD) made from poly(TMS-CHD)

The difference in stereo-regularity between the two polymers is also evident in the DSC, where radically polymerized poly(DA-CHD) has been found in the prior art to have a glass transition temperature ($T_g$) at 181° C., while 1,4-poly(DA-CHD) made by the inventive process appears to have a $T_g$ near 295° C.; FIG. 12 depicts the DSC for 1,4-poly(DA-CHD) prepared by the process of the invention.

This evidence suggests that the poly(DA-CHD) made from 1,4-poly(TMS-CHD) is intrinsically different than radically-produced poly(DA-CHD). (It should be noted that all comparative data herein were performed with a sample of radically polymerized poly(DA-CHD) provided by ICI Chemicals and Polymers, United Kingdom.)

Figure 13:
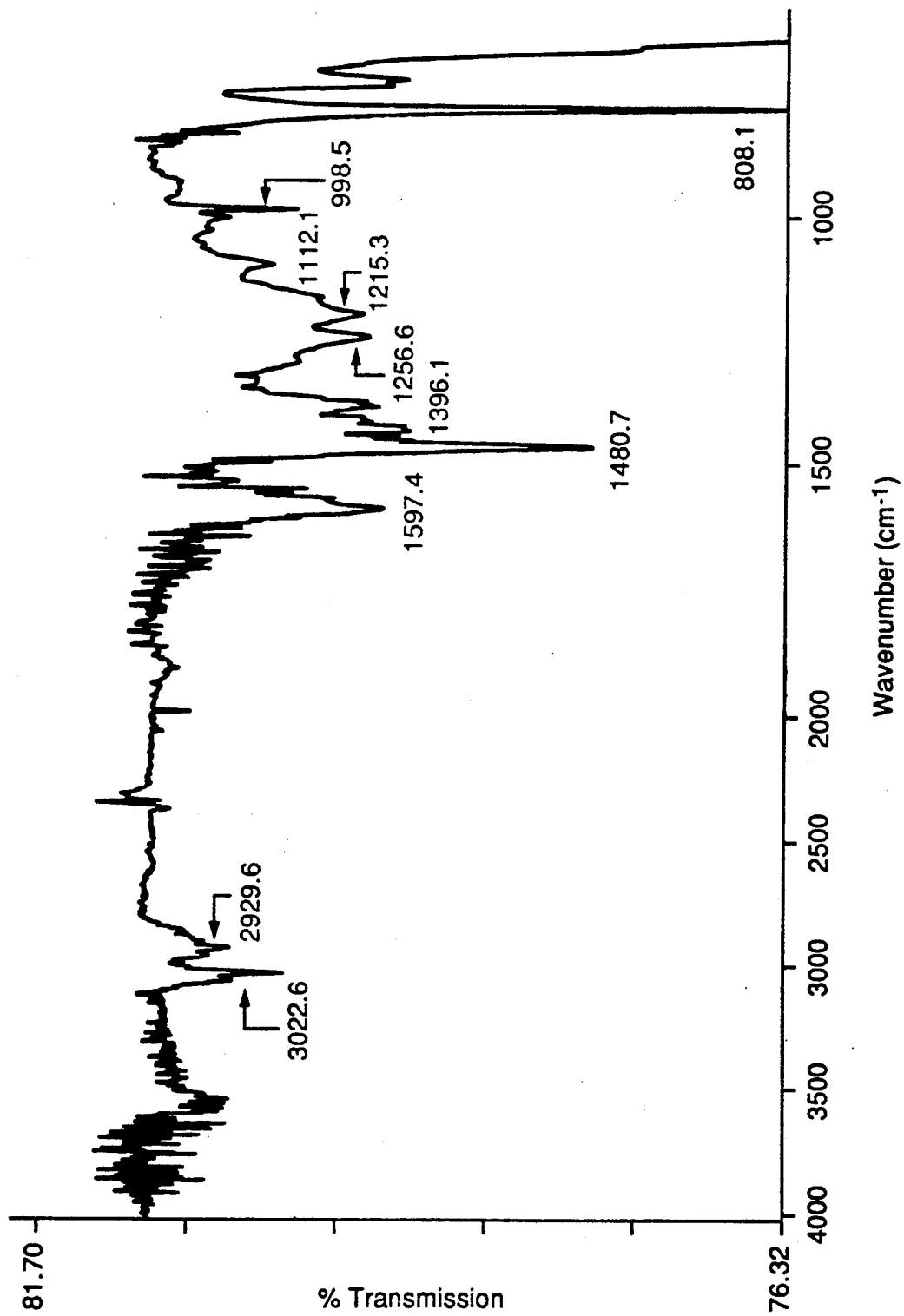
FIG. 13 is the IR spectrum of poly(para-phenylene) made from 1,4-poly(DA-CHD) prepared by the process of the invention.

When heated in the solid state as a powder or film under inert atmosphere or vacuum, 1,4-poly(DA-CHD) can be converted to poly(para-phenylene) with loss of acetic acid, as depicted in FIG. 5. Temperatures of about 300° to 340° C. were found to be optimum for the solid state pyrolysis reaction. The poly(para-phenylene) so formed can be a black flaky powder or a shiny black film with a UV/visible absorption maximum at 310 nm and an IR signal at 808.1 cm$^{-1}$; FIG. 13 depicts the IR spectrum. These two parameters are generally used to characterize poly(para-phenylene), and the values herein compare favorably with those given in the prior art for this polymer.

Figure 14A:
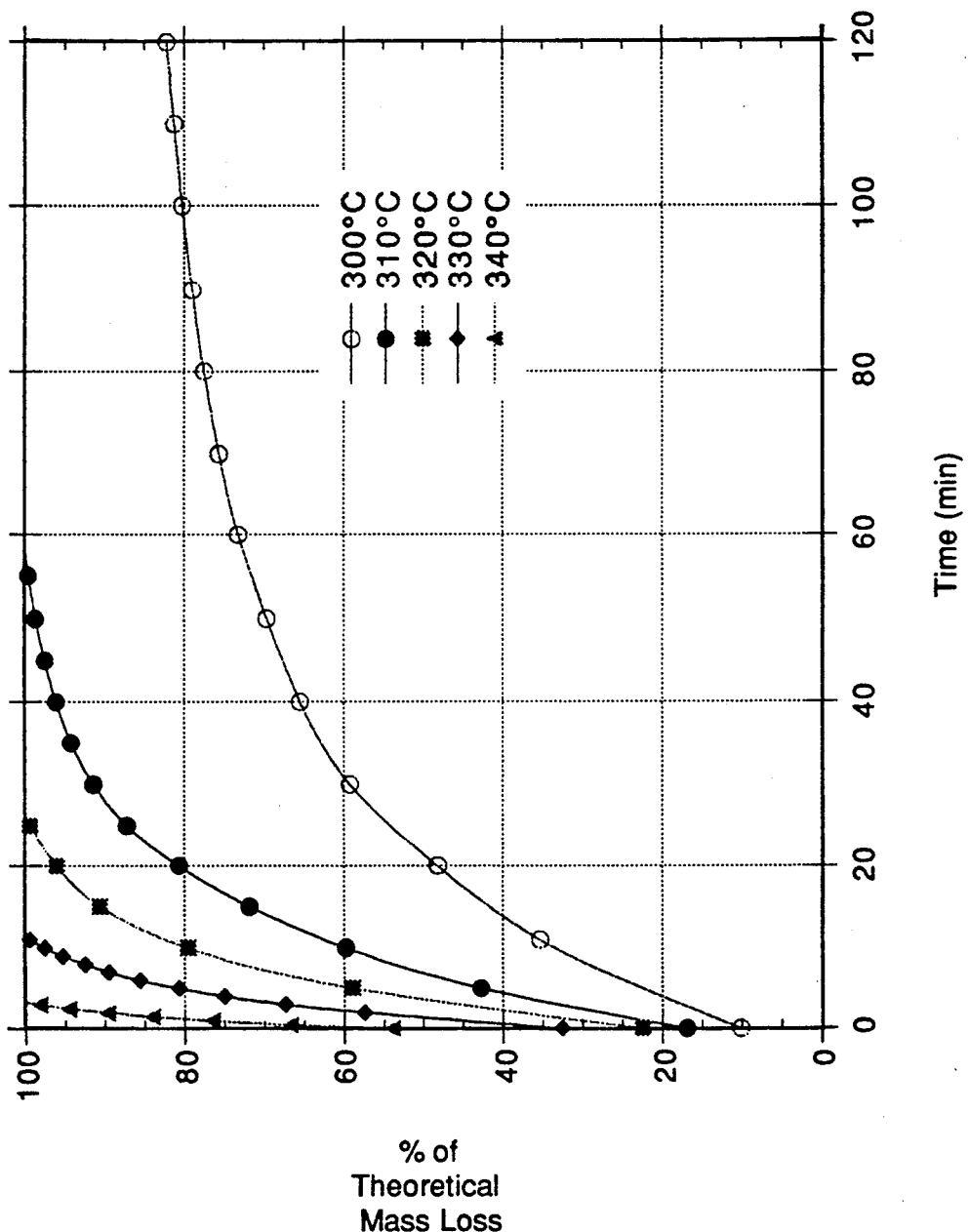
FIG. 14a, on coordinates of percent and time in minutes, is a plot of % of theoretical mass loss as a function of time for poly(DA-CHD) at different temperatures ranging from 300° to 340° C.
Figure 14B:
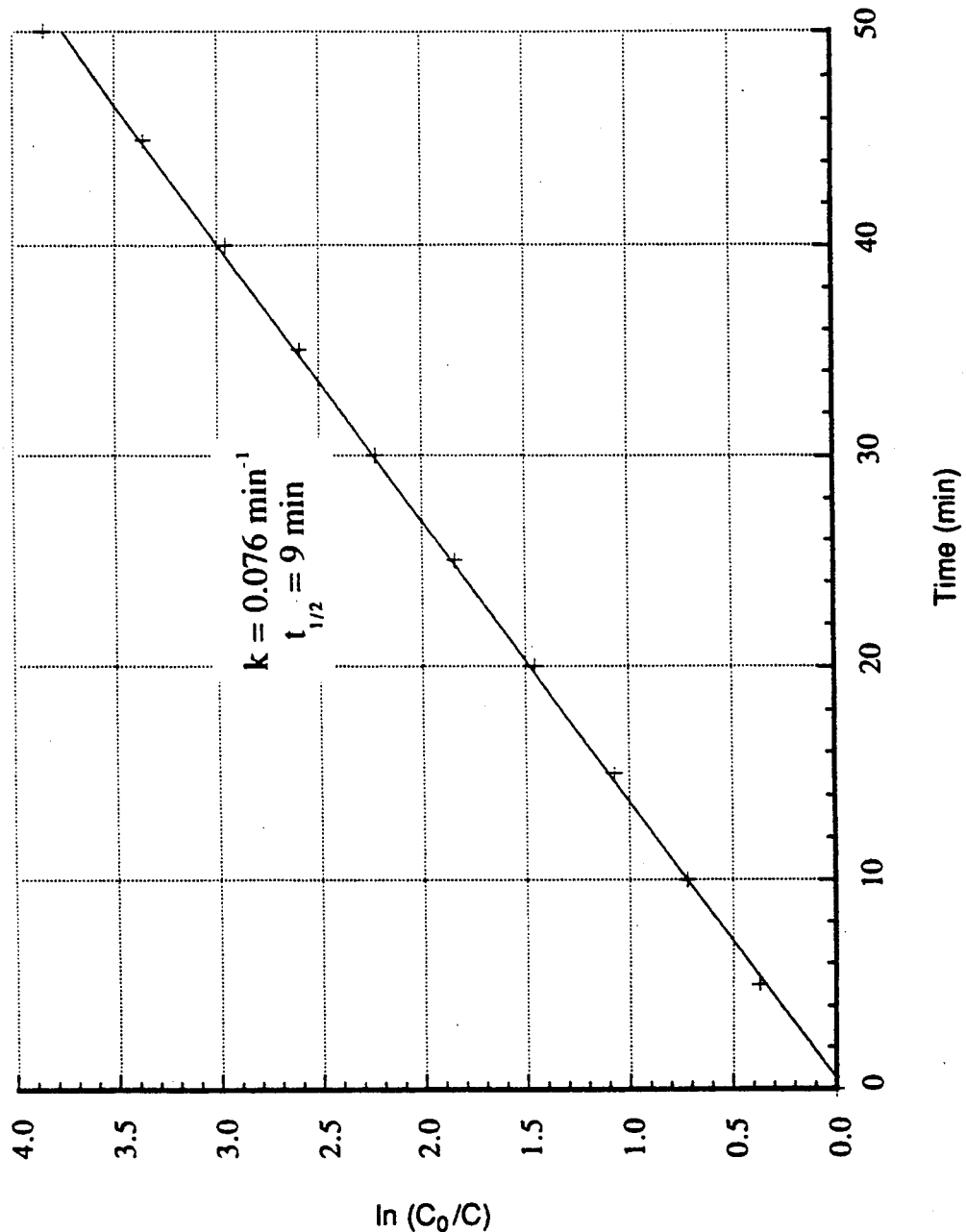
FIG. 14b, on coordinates of logarithmic ratio of starting concentration to concentration and time, shows the first order kinetics for the thermolysis experiment of FIG. 14a, performed at 310° C.
Figure 15:
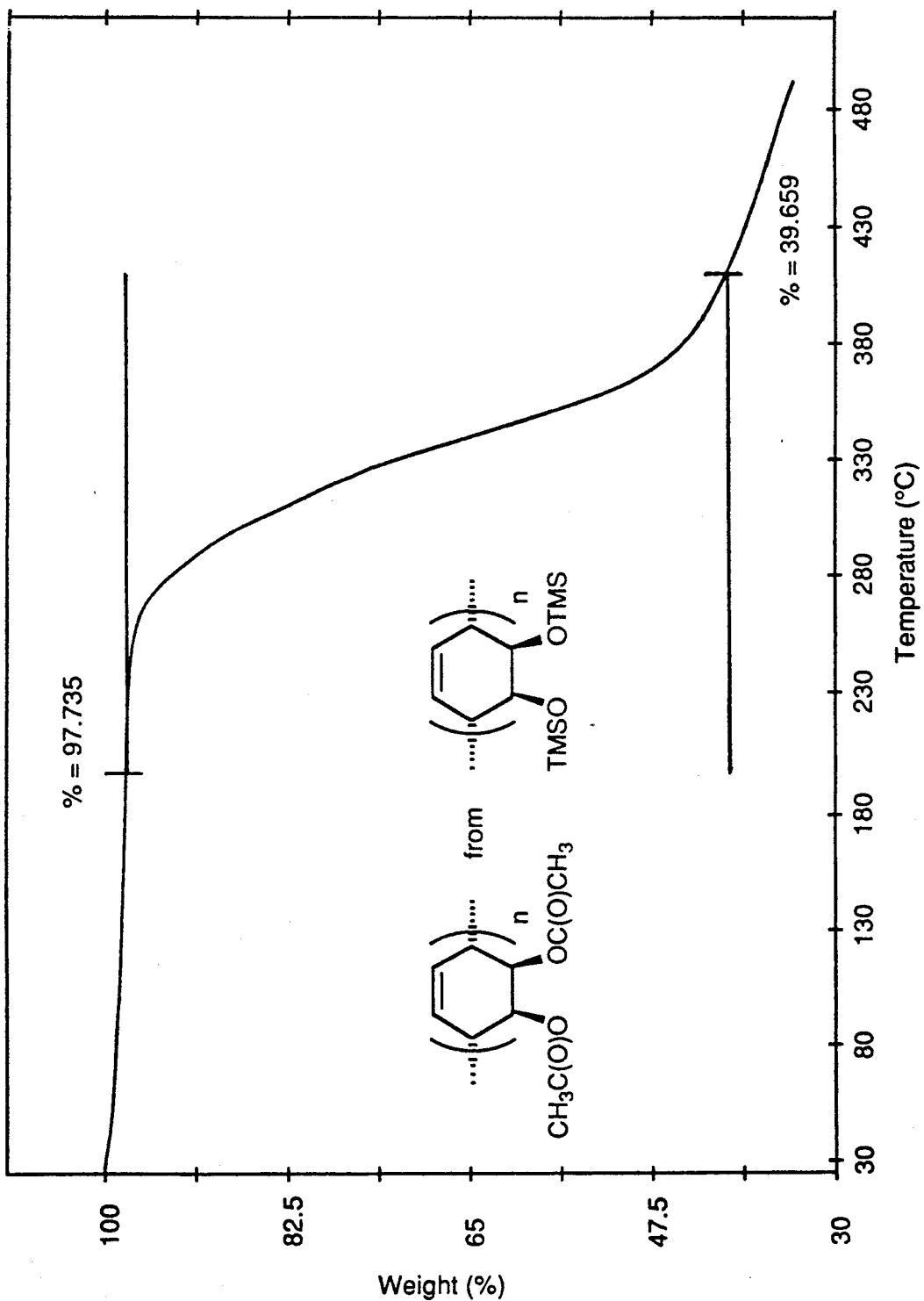
FIG. 15, on coordinates of weight percent and temperature in ° C., is a thermogravimetric profile for 1,4-poly(DACHD) made from 1,4-poly(TMS-CHD).

FIGS. 14a and 14b are typical aromatization kinetics data for the pyrolysis of 1,4-poly-(DA-CHD), produced by the process of the invention, to poly-(para-phenylene) at 300° to 340° C. (FIG. 14a) and at 310° C. (FIG. 14b). In the latter Figure, the first order rate constant k is determined to be 0.076 min.$^{-1}$ and the half life ($t_\frac{1}{2}$; the time required for the sample to decompose from one concentration to half of that value) is 9 min. FIG. 15 provides the thermogravimetric analysis of the 1,4-poly(DA-CHD) precursor.

In summary, (ANiTFA)$_2$ can polymerize derivatives of 1,3-cyclohexadiene in a 1,4-fashion, as long as the functional groups do not coordinate to the catalyst or are not easily eliminated. The trimethylsiloxy derivative is compatible with this catalyst. The resulting polymer appears to be entirely 1,4-linked. It is soluble in non-polar solvents and ordered in the solid state. The polymer can be easily converted to another precursor polymer to PPP, as described above.

INDUSTRIAL APPLICABILITY

Poly(TMS-CHD) can be converted to 1,4-poly(cis-5,6-diacetoxy-1,3-cyclohexadiene), which has been shown in the prior art to be a precursor to poly(para-phenylene). The resulting high regioselectivity (>96% 1,4-linkages) results in highly improved mechanical properties of the final polymer. Further, the catalysts bis(allyltrifluoroacetato nickel II) and bis(allylpentafluorophenoxy nickel II) may be employed to polymerize substituted cyclohexadienes.

EXPERIMENTAL

General Considerations

All manipulations of air- and/or water-sensitive compounds were performed using conventional high vacuum or Schlenk techniques. Argon was purified by passage through columns of BASF R3-11 catalyst (Chemlog) and 4 Å molecular sieves (Linde). Solid organometallic compounds and organic monomers were transferred and stored in a nitrogen filled Vacuum Atmospheres drybox. NMR spectra were recorded on a JEOL GX-400 (399.95 MHz $^1$H, 100.40 MHz $^{13}$C spectrometer. Infrared spectra were recorded with a Perkin-Elmer 1600 series FT-IR spectrometer. Gel permeation chromatograms were obtained on a Waters 150 C ALC/GPC using toluene at a flow rate of 1.0 mλ/min and a column temperature of 35° C.; or on a custom system consisting of three Styragel columns, an Altex Model 110A pump, and a Knauer differential refractometer using methylene chloride as the eluant at a flow rate of 1.5 mλ/min at room temperature. Powder X-ray diffraction studies were performed on a Guinier camera with a camera constant of 0.358278 deg/mm, using CuKo radiation. Differential scanning calorimetry was performed on a Perkin-Elmer DSC-7, and thermogravimetric analysis was performed on a Perkin-Elmer TGS-2.

Pentane, n-heptane, benzene, diethyl ether, THF, and DME were vacuum transferred from sodium benzophenone ketyl. Methylene chloride was vacuum transferred from $P_2O_5$. Chlorobenzene was distilled, dried over molecular sieves, and filtered through activated alumina. Ortho-dichlorobenzene was distilled from calcium hydride at 20 Torr. Pyridine and triethylamine were both distilled from calcium hydride. Chlorotrimethylsilane was distilled from magnesium filings. Allyl trifluoroacetate was prepared by refluxing allyl alcohol and trifluoroacetic acid in a Dean-Stark apparatus and purified by distillation. 1,3-Butadiene was purified by condensation of the gas onto calcium hydride at −78° C., and degassed by repeated freeze-pump-thaw cycles. 1,3-Cyclohexadiene was distilled from sodium borohydride. Cis-5,6-dihydroxy-1,3-cyclohexadiene was obtained from Aldrich Chemical and recrystallized from ethyl acetate and pentane prior to use. The acetyl and methoxycarbonyl derivatives were obtained from ICI and used as was. All monomers were stored in anhydrous, sub-zero conditions.

All distillations were performed under argon. All solvents and liquid reagents were degassed by repeated freeze-pump-thaw cycles and stored under argon in Kontes flasks. Solid phase reagents and monomers were degassed in vacuo and stored in the drybox prior to use.

Preparation of (ANiTFA)$_2$ Catalyst 1.00 g (3.64 mmol) of Ni(1,4-cyclooctadiene)$_2$ (Ni(COD)$_2$; freshly recrystallized from toluene) was crushed with a mortar and pestle. The yellow powder was suspended in approximately 20 mλ of rapidly stirred diethyl ether and then added in approximately 5 mλ aliquots to 1.12 (7.27 mmol) of allyl trifluoroacetate at 0° C. The resulting deep red mixture was stirred for 1½ hours at 0° C., or until all of the yellow Ni(COD)$_2$ was consumed. The resulting clear red solution was then cannula-filtered through a plug of glass microfibre disk, and three-quarters of the solvent was pumped off while the mixture remained at 0° C. The resulting brown-red slurry was washed with 2×10 mλ aliquots of pentane at −78° C., the supernatant was drawn off to yield an orange-brown powder, which was dried in vacuo overnight at 0° C. (yield 0.560 g; 72.4%).

Analysis: $^1$H NMR (C$_6$H$_6$): 4.80–5.30 ppm (1H), 2.45 ppm (2H), 1.60–1.90 ppm (2H).

Preparation of Cis-5,6-bis(trimethylsiloxy)-1,3-Cyclohexadiene 2.02 g (18.9 mmol) of cis-5,6-dihydroxy-1,3-cyclobutadiene and a few grains of 4-(N,N-dimethyl amino) pyridine (4-DMAP) were dissolved in a mixture of approximately 80 mλ of methylene chloride and 4.32 mλ (52.0 mmol) of pyridine. While rapidly stirring under argon with the temperature moderated with a room temperature water bath, 4.27 g (39.0 mmol) of trimethylchlorosilane, diluted with a few mλ of methylene chloride, was added dropwise to the pale yellow solution. After stirring for 1½ hrs at room temperature, the resulting cloudy white suspension was diluted with 10 mλ of pentane to completely precipitate out the pyridinium hydrochloride salts. The salts were removed by filtration through a medium porosity frit. The solvent was removed from the filtrate in vacuo to yield a pale yellow oil. Vacuum distillation of the oil in a short path distillation apparatus yielded 3.92 g (84.8%) of a viscous, colorless, clear liquid (bp: 47° C. at 2 μm Hg pressure).

C$_6$H$_6$(OTMS)$_2$: $^1$H NMR (C$_6$D$_6$): 5.73–5.88 ppm (4H); 4.12 ppm (2H); 0.14 ppm (18H).

Polymerizations and Copolymerizations of Cis-5,6-Dihydroxy-1,3-Cyclohexadiene Derivatives Approximately 0.010 g (2.35×10$^{15}$ mol) of (ANiTFA)$_2$ was weight out in a vial in a drybox, and then dissolved in 2.3 mλ of solvent to give a clear orange solution. This solution was passed through a 0.5 micron Millipore filter, and then injected into a 50 mλ capacity, thick walled glass Schlenk bomb with a 8 mm Kontes valve. The appropriate amount of liquid monomer was then passed through a plug of basic alumina and added to the reaction vessel. In the case of the CHD homopolymerizations and copolymerizations, about 470 to 480 equivalents of monomer to catalyst were added in total. For the TMS-CHD polymerizations, about 50 to 200 equivalents were added. Solid monomers were added by a powder funnel, while liquid monomers were added by syringe or pipet in the drybox. In the case of copolymerizations, the more reactive monomer was always added before the less active one. The polymerization mixture was degassed by repeated freeze-pump-thaw cycles and then backfilled with argon. After heating in a 50° C. oil bath with rapid stirring for 24 hours, the mixture was poured into about 30 to 50 mλ of a solvent in which the polymer was insoluble (usually, methanol). The polymer was isolated by suction filtration, redissolved in a minimum amount of solvent if possible, and then re-isolated by the same method. The final product was dried in vacuo to yield a fine white powder.

1,4-PCHD (88.4% yield in o-dichlorobenzene): $^1$H NMR (C$_6$D$_6$): 5.6–5.8 ppm (2H); 1.9–2.1 ppm (2H); 1.4–1.7 ppm (4H).

Copolymers of Various Compositions of CHD and BMC-DHCD $^1$H NMR (CDCl$_3$): 5.4–5.9 ppm (olefinic protons); 3.6–3.9 ppm (methoxycarbonyl protons); 1.2–2.1 ppm (allylic and methylene protons).

Poly(TMS-CHD)

(93% yield with 1.5 M TMS-CHD and monomer:-catalyst ratio=80:1, in chlorobenzene)

$^1$H NMR (C$_6$D$_6$): 5.1–6.7 ppm (2H); 3.8–4.4 ppm (2H); 3.2–3.6 ppm (1H); 2.4–2.9 ppm (1H); 0.0–0.8 ppm (18H).

Elemental Analysis: Expected C 56.19, H 9.43, Si 21.90.

C$_{12}$H$_{24}$O$_2$Si$_2$: Actual C 55.91, H 9.34, Si 22.21.

Preparation of 1,4-Poly(cis-5,6-diacetoxy)-1,3-cyclohexadiene)

A 50 mλ Schlenk flask with an 8 mm Kontes valve was charged with 1,4-poly(cis-5,6-bis(trimethylsiloxy)-1,3-cyclohexadiene) (149.5 mg; 0.583 mmol) and anhydrous zinc chloride (167 mg; 1.23 mmol) in a nitrogen-filled glove box. On a Schlenk line, dry, degassed diethyl ether (10 mλ) was added via syringe under Ar flush to the reaction vessel. The mixture was stirred for 0.5 hr to completely dissolve the ZnCl$_2$. Then, distilled and degassed acetyl chloride (350 µl; 6.19 mmol) was added via syringe as a neat liquid to the clear, colorless solution under Ar flush. The mixture immediately became cloudy, and a pale yellow, gelatinous solid gradually precipitated with stirring over an 18 hr period. Subsequently, the reaction mixture was decanted into methanol (100 mλ) to precipitate the polymer. A colorless powder was isolated by filtration and washed with methanol (20 mλ). Vacuum-drying of this solid (<10 µm Hg, 1 hr) afforded 87 mg (76% yield) of 1,4-poly-(cis-5,6-diacetoxy-1,3-cyclohexadiene). This polymer was purified by dissolution in the minimal amount of dichloromethane, filtration, and re-precipitation into hexanes (100 mλ). The resulting colorless powder was dried in vacuo for 12 hr.

Analysis: $^1$H NMR (400 MHz, CDCl$_3$): δ 5.88 (s,2H), 2.82 (s,2H), 2.07 (s,2H), 2.07 (s,6H). $^{13}$C NMR (100 MHz, CDCl$_3$): δ 170, 127, 71, 37, 21.5. IR (KBr mull): cm$^{-1}$ 3037, 2932, 1746, 1644, 1434, 1372, 1240, 1166, 1053, 1026, 928, 768.

Anhydrous ferric chloride (FeCl$_3$) can also be used in place of ZnCl$_2$ under the same reaction conditions for the conversion of 1,4-poly(cis-5,6-(trimethylsiloxy)-1,3-cyclohexadiene) to 1,4-poly(cis-5,6-diacetoxy-1,3-cyclohexadiene). However, after the 1,4-poly(TMS-CHD), FeCl$_3$, and acetyl chloride have been stirring in diethyl ether for ½ hr, the reaction mixture must be quenched in methanol and worked up as in the ZnCl$_3$ case to prevent further reaction of the FeCl$_3$ with the 1,4-poly(DA-CHD) formed.

Differential Scanning Calorimetry indicated a glass transition (T$_g$) centered at 298° C., and an exotherm for loss of acetic acid (T$_{onset}$=230° C., T$_{max}$=361° C). Analysis of this pyrolyzed material by infrared spectroscopy indicated the formation of 1,4-poly(para-phenylene).

In addition, treatment of 1,4-poly(cis-5,6-bis(trimethylsiloxy)-1,3-cyclohexadiene) with two equivalents of iodotrimethylsilane in dimethyl ether resulted in the quantitative displacement of the trimethylsiloxy group and formation of a new polymeric material with the postulated structure 1. The further formation of this product, cis-1,4-poly(5,6-diiodo-1,3-cyclohexadiene), and its potential for conversion to poly(para-phenylene) are under study.

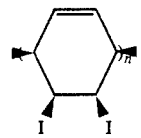

1

Synthesis and Polymerization of 5-methyl-1,3-cyclohexadiene 12.5 g (0.130 moles) of (±)5-methyl-1,3-cyclohexadiene 99.7%, Wiley Organics) was dissolved in 30 mλ of carbon tetrachloride and 1.5 mλ of absolute ethanol in a 250 mλ B14/20 3-neck round bottom flask. Under an argon flush, 18.00 g (0.113 moles) of bromine diluted with 15 mλ of CCl. was added dropwise to the reaction mixture at −5° C. At the end of the addition, a simple distillation apparatus was attached and excess starting olefin was distilled off at 103° C. The dark residue was separated by fractional distillation at 0.1 Torr. The product, 1,2-dibromo-4-methyl cyclohexane, was collected at 50° to 51° C. in 83.0% yield (24.02 g).

10.00 g (0.039 moles) of 1,2-dibromo-4-methylcyclohexane was added dropwise to a mixture of sodium isopropoxide at 100° to 110° C. (The isopropoxide mixture was made by adding 2.08 g of NaH to 11.7 mλ of dry isopropanol and 19.5 mλ of triethylene glycol dimethyl ether under an argon flush.) The low boiling fraction (product and isopropanol) was isolated by distillation from the reaction mixture at 75° to 78° C., using a dry ice/isopropanol cold trap. The isopropanol was removed by washing the distillate with water and drying the organic layer over calcium hydride. 0.60 g (16.34%) of a colorless, clear liquid was isolated by vacuum transfer:

$^1$H NMR (CDCl$_3$): 1.0 ppm (3H); 1.5–2.8 ppm (5H); 5.5–5.9 ppm (4H).

In the drybox, 0.025 g (5.8×10$^{15}$ moles) of (ANiT-FA)$_2$ was weighed out in a vial and dissolved in 3.5 ml of o-dichlorobenzene. The orange solution was clarified by passing through a 0.5 micron Millipore filter into a Schlenk bomb. 0.400 g (4.25×10$^{-3}$ mole) of 5-methyl-1,3-cyclohexadiene was passed through 0.5 cm of basic alumina in the dry box and was injected into the catalyst solution. The bomb was sealed up, freeze-pump-thawed three times, and filled with argon. The polymerization mixture was heated for 24 hours in a 50° C. oil bath before precipitating out the polymer by pouring the mixture into 40 ml of methanol. The resulting grey gum was redissolved in 20 ml of benzene and re-precipitated into methanol after passing the solution through a 0.5 micron Millipore filter. 0.132 g (33.0%) of a white, soluble powder was isolated by suction filtration and dried under dynamic vacuum:

$^1$H NMR (CDCl$_3$): 0.8–1.0 ppm (3H); 1.2–2.2 ppm (5H); 5.4–5.8 ppm (2H).

GPC: Mn=1406 (vs. polystyrene standards), Mw=1628, PDI=1.16.

XRD: no sharp lines =>amorphous

DSC stable up to —330° C., contrast to PCHD 320° C.

Neopentyl, and other substituted CHDs, are synthesized and polymerized similarly. Because these alkyl-substituted PCHDs are soluble and have the same thermal stability as the parent PCHD polymer, they are likely to find use as inexpensive, high performance polymers, especially when a small amount is copolymerized with normal CHD to make the PCHD soluble.

Thus, there has been disclosed a process for the preparation of novel polymers of substituted cyclohexadienes, including 1,4-poly(cis-5,6-bis(trimethylsiloxy)-1,3-cyclohexadiene, employing certain nickel catalysts. The 1,4-polymers produced by the process of the invention have substantially 100% 1,4-linkages and virtually no 1,2-linkages. It will be apparent to those skilled in the art that various modifications and changes of an obvious nature may be made, and all such modifications and changes are considered to fall within the scope of the invention, as defined by the appended claims.

What is claimed is:

1. Cis-1,4-poly(5,6-diiodo-1,3-cyclohexadiene).

2. A process for preparing cis-1,4-poly(5,6-diiodo-1,3-cyclohexadiene) comprising reacting 1,4-poly(cis-5,6-bis(trimethylsiloxy)-1,3-cyclohexadiene with iodotrimethylsilane.

3. The process of claim 2 employing two equivalents of iodotrimethylsilane per equivalent of said 1,4-poly(cis-5,6-bis(trimethylsiloxy)-1,3-cyclohexadiene.

4. Polymerized 5-, 6-, or 5,6- alkyl substituted cyclohexadienes.

5. A process for polymerizing 5-, 6-, or 5,6- alkyl substituted cyclohexadienes comprising reacting a substituted cyclohexadiene with a catalyst selected from the group consisting of bis(allyltrifluoroacetato nickel II) and bis(allylpentafluorophenoxy nickel II).

6. The process of claim 5 wherein said reaction is carried out in the presence of a solvent for said substituted cyclohexadiene.

7. The process of claim 6 wherein said solvent is selected from the group consisting of o-dichlorobenzene, chlorobenzene, toluene, benzene, chloroform, and methylene chloride.

* * * * *